US012791362B2

(12) United States Patent
Imai

(10) Patent No.: US 12,791,362 B2
(45) Date of Patent: Nov. 10, 2026

(54) OPTICAL ENCODER SCALE, MULTIFACED OPTICAL ENCODER SCALE AND OPTICAL ENCODER

(71) Applicant: DAI NIPPON PRINTING CO., LTD, Tokyo (JP)

(72) Inventor: Tsuyoshi Imai, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 91 days.

(21) Appl. No.: 18/805,740

(22) Filed: Aug. 15, 2024

(65) Prior Publication Data

US 2025/0067579 A1 Feb. 27, 2025

(30) Foreign Application Priority Data

Aug. 22, 2023 (JP) ................................ 2023-134522
May 20, 2024 (JP) ................................ 2024-081530

(51) Int. Cl.

*G01D 5/34* (2006.01)
*G01B 11/02* (2006.01)
*G01D 5/347* (2006.01)

(52) U.S. Cl.

CPC ......... *G01D 5/34715* (2013.01); *G01B 11/02* (2013.01); *G01D 5/3473* (2013.01); *G01D 5/34746* (2013.01)

(58) Field of Classification Search

CPC .. G01D 5/347; G01D 5/34715; G01D 5/3473; G01D 5/34746; G01B 11/02

See application file for complete search history.

(56) References Cited

U.S. PATENT DOCUMENTS

| | | | | |
|---|---|---|---|---|
| 2013/0127644 | A1 | 5/2013 | Aoki et al. | |
| 2015/0102105 | A1 * | 4/2015 | Perret | G06K 19/06046 235/440 |
| 2019/0121323 | A1 | 4/2019 | Tokushima et al. | |
| 2023/0126475 | A1 | 4/2023 | Nakazawa et al. | |

FOREIGN PATENT DOCUMENTS

| | | | | |
|---|---|---|---|---|
| CN | 104246447 | A * | 12/2014 | B29C 45/0053 |
| CN | 109696184 | A | 4/2019 | |
| EP | 3 296 703 | A1 | 3/2018 | |
| JP | 2013-108873 | A | 6/2013 | |
| TW | 201643378 | A | 12/2016 | |
| WO | 2021/201024 | A1 | 10/2021 | |

* cited by examiner

*Primary Examiner* — Kevin K Pyo

(74) *Attorney, Agent, or Firm* — HSML P.C.

(57) ABSTRACT

The present disclosure provides an optical encoder scale comprising an optical pattern including two regions with different reflectance or transmittance, wherein the optical encoder scale includes a two-dimensional code.

12 Claims, 12 Drawing Sheets

OPTICAL ENCODER SCALE, MULTIFACED OPTICAL ENCODER SCALE AND OPTICAL ENCODER

TECHNICAL FIELD

The present disclosure relates to an optical encoder scale, a multifaced optical encoder scale, and an optical encoder.

BACKGROUND ART

Conventionally, optical encoders have been used for servo motors with control mechanisms. The optical encoder includes an optical scale, a light source such as an LED configured to irradiate light to the optical scale, and a light detector configured to detect transmitted light or reflected light from the optical scale. A high degree of accuracy is required to the optical encoders. Therefore, traceability is important, so that the production history of the optical encoder may be traced in the event of a failure.

CITATION LIST

Patent Document

Patent Document 1: WO2021/201024

SUMMARY OF DISCLOSURE

Technical Problem

The traceability is also required for optical scales used in the optical encoders. Conventionally, as a method for identifying an optical scale, the following methods have been known: a method wherein the identification information is a letter, a number, or a symbol, and the information is determined with the human eye; and a method wherein letters are recognized by OCR (Optical Character Recognition). However, when the information is determined with the human eye, there are problems of misreading and typographical errors, as well as problems in terms of efficiency and cost. Also, in the case of OCR, although it is advantageous in terms of efficiency and cost since letters are read by a machine, there is a concern of misreading.

The present disclosure has been made in view of the above circumstances, and a main object of the present disclosure is to provide an optical encoder scale capable of ensuring traceability.

Solution to Problem

One embodiment of the present disclosure provides an optical encoder scale comprising an optical pattern including two regions with different reflectance or transmittance, wherein the optical encoder scale includes a two-dimensional code.

Another embodiment of the present disclosure provides a multifaced optical encoder scale comprising optical encoder scales including an optical pattern including two regions with different reflectance or transmittance, arranged in a multifaced manner, wherein the optical encoder scale includes a two-dimensional code; the multifaced optical encoder scale includes one or more unit regions; and in the unit region, the two-dimensional code differs for each optical encoder scale.

Another embodiment of the present disclosure provides an optical encoder comprising the optical encoder scale described above; a light source configured to irradiate measurement light to a surface of the optical encoder scale; and a light detector configured to detect reflected light or transmitted light from the optical encoder scale.

Advantageous Effects of Disclosure

The optical encoder scale in the present disclosure exhibits an effect of ensuring traceability.

DESCRIPTION OF EMBODIMENTS

Embodiments of the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely "on" or "below", unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely "on the surface side" or "on the surface", unless otherwise stated, it includes both of the following cases: a case wherein some member is placed directly on or directly below the other member so as to be in contact with the other member, and a case wherein some member is placed on the upper side or the lower side of the other member via yet another member.

Also, in the present descriptions, "optical encoder scale" may be referred to as merely "optical scale".

The optical encoder scale, multifaced optical encoder scale, and optical encoder in the present disclosure are hereinafter described in detail.

A. Optical Encoder Scale

The optical encoder scale in the present disclosure comprises an optical pattern including two regions with different reflectance or transmittance, wherein the optical encoder scale includes a two-dimensional code. The optical encoder scale in the present disclosure may be a reflection-type optical encoder scale including an optical pattern including two regions with different reflectance, that is, a reflection region (high reflection region) and a non-reflection region (low reflection region); and may be a transmission-type optical encoder scale including an optical pattern including two regions with different transmittance, that is, a transmission region and non-transmission region (light shielding region).

Figure 1:
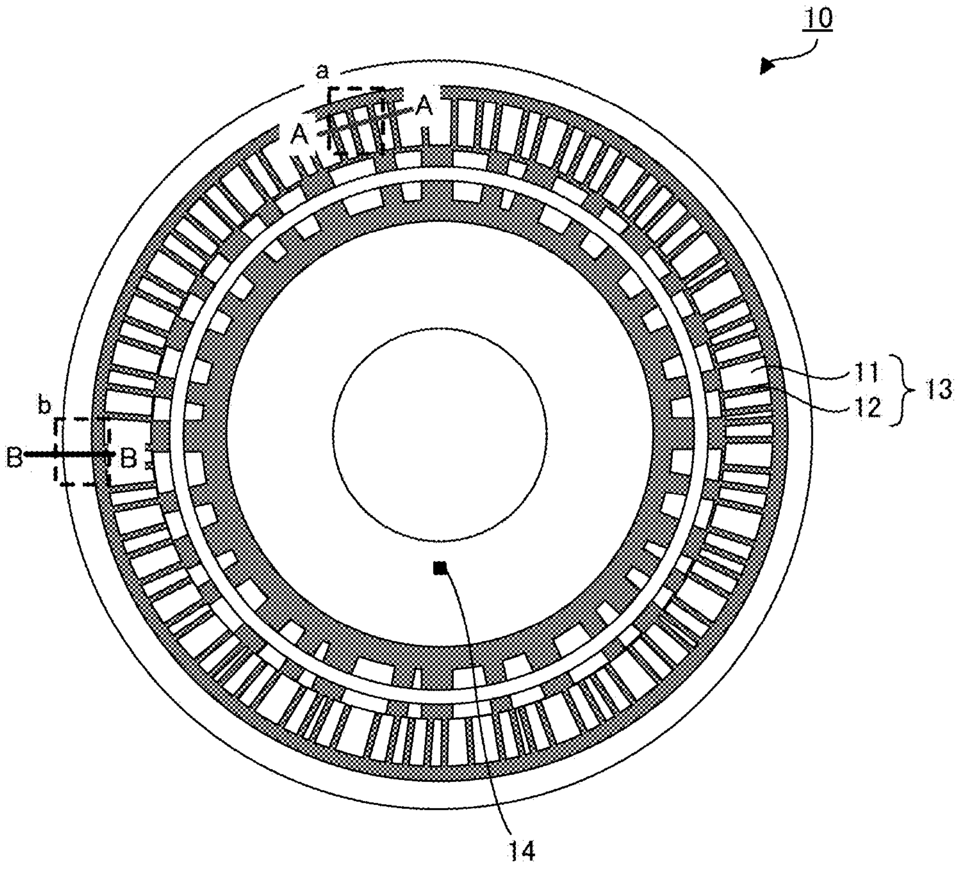
FIG. 1 is a schematic plan view illustrating an example of an optical encoder scale in the present disclosure.

FIG. 1 is a schematic plan view illustrating an example of a reflection-type optical encoder scale in the present disclosure. As shown in FIG. 1, the reflection-type optical encoder scale 10 comprises an optical pattern 13 including two regions with different reflectance, that is, a high reflection region 11 and a low reflection region 12. The reflection-type optical encoder scale 10 includes a two-dimensional code 14 in a region other than an optical pattern region where the optical pattern 13 is placed.

Figure 2:
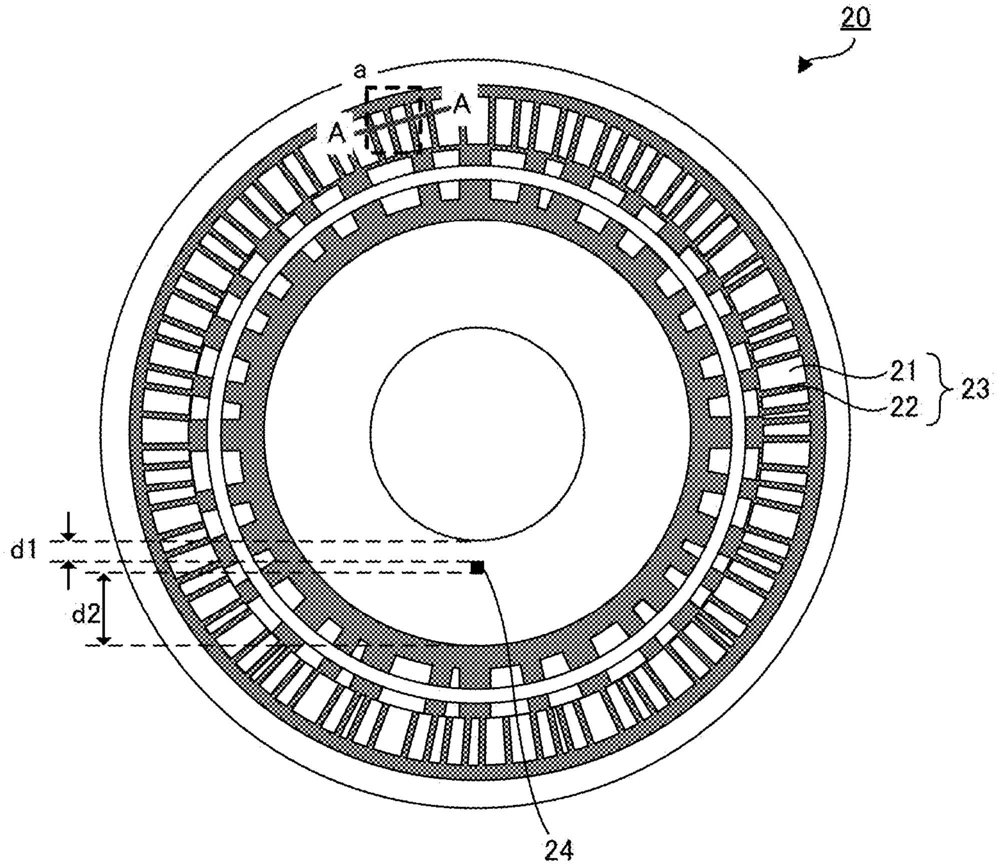
FIG. 2 is a schematic plan view illustrating an example of an optical encoder scale in the present disclosure.

FIG. 2 is a schematic plan view illustrating an example of a transmission-type optical encoder scale in the present disclosure. As shown in FIG. 2, the transmission-type optical encoder scale 20 comprises an optical pattern 23 including two regions with different transmittance, that is, a transmission region 21 and a light shielding region 22. The transmission-type optical encoder scale 20 includes a two-dimensional code 24 in a region other than an optical pattern region where the optical pattern 23 is placed.

In the present disclosure, traceability may be ensured by associating the production history of the optical encoder scale with the two-dimensional code. The two-dimensional code is able to improve reading accuracy. Therefore, traceability may be improved. Also, the two-dimensional code is able to record a lot of information in a small space. The size of characters that may be recognized by the human eye is approximately 2 mm or 3 mm. However, with the two-dimensional code, the size of the entire two-dimensional code may be smaller. Therefore, in the optical encoder scale, the two-dimensional code may be easily placed in a region other than the optical pattern region. Also, since the two-dimensional code is read by a machine, efficiency may be improved so that labor costs may be reduced.

In the production of an optical scale, a multifaced body including the optical scales arranged in a multifaced manner, is sometimes used.

Figure 3:
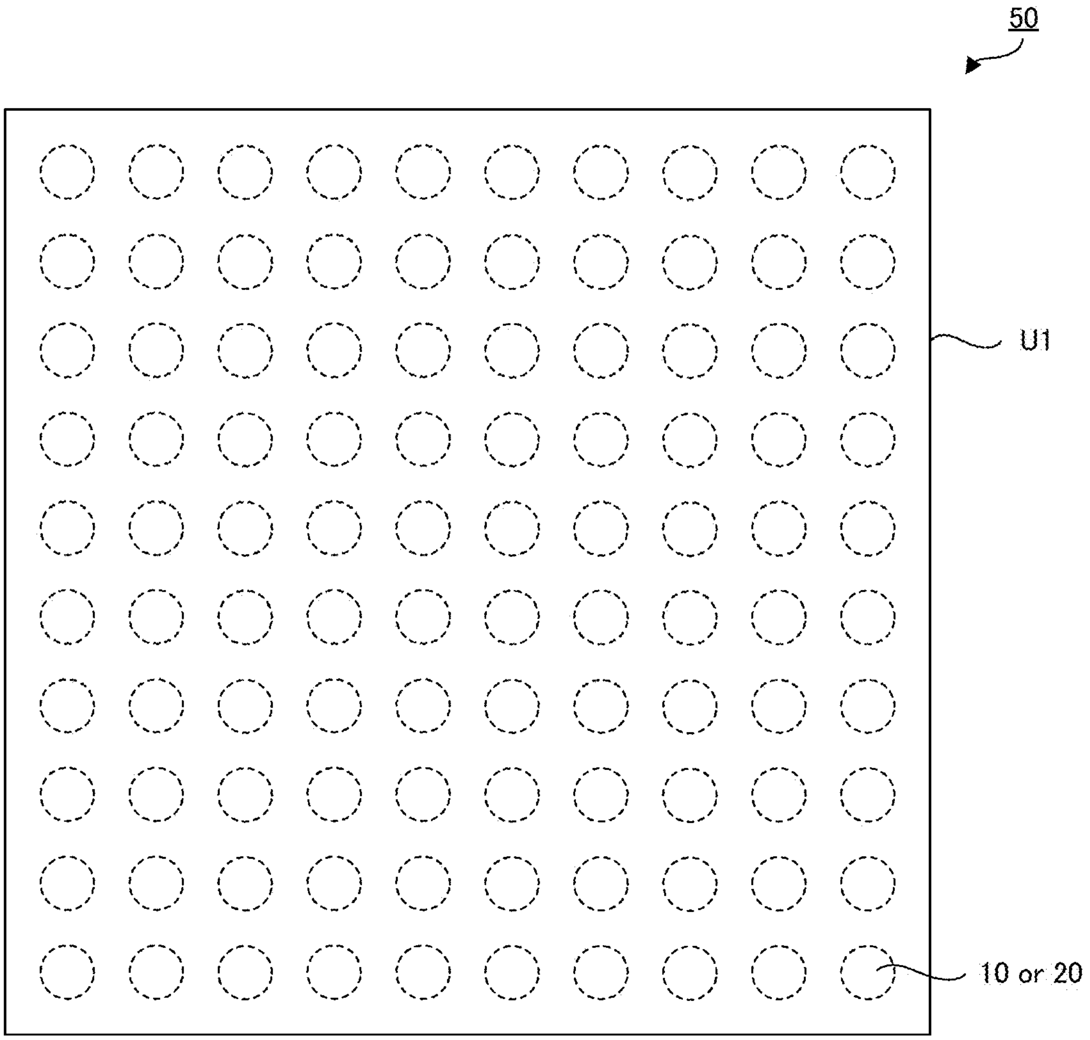
FIG. 3 is a schematic plan view illustrating an example of a multifaced optical encoder scale in the present disclosure.
Figure 4:
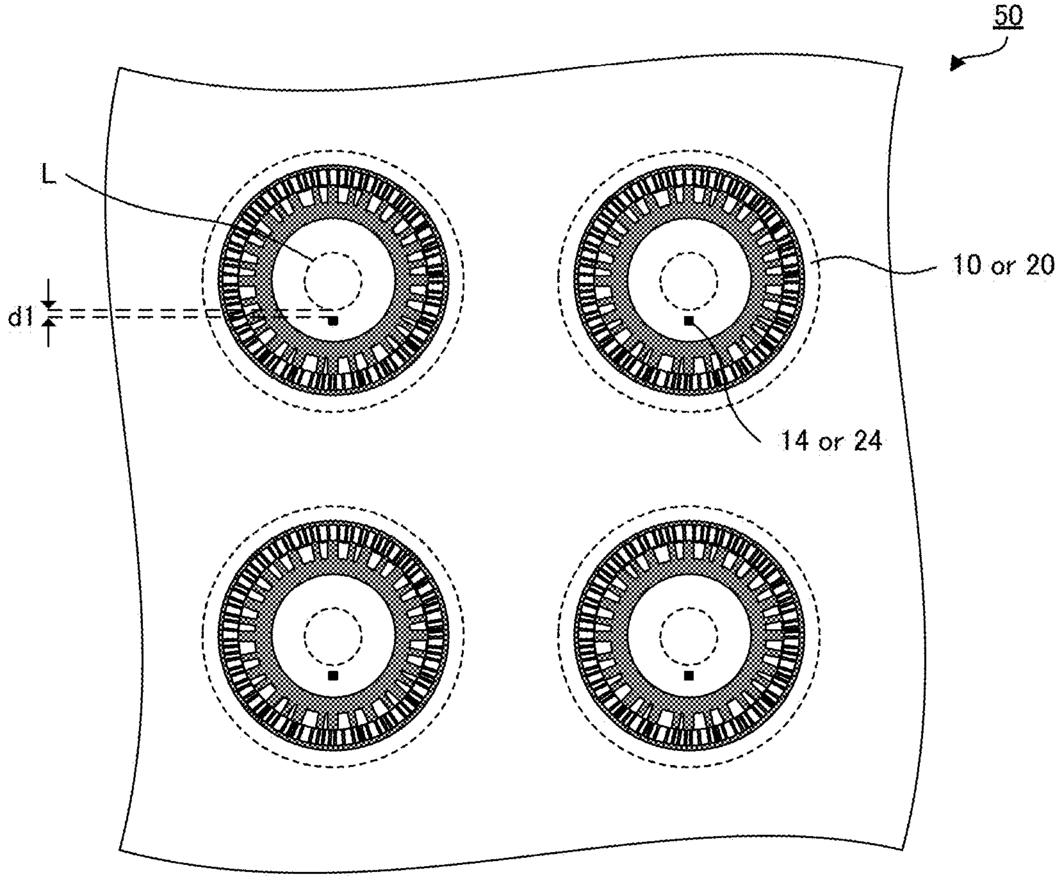
FIG. 4 is a schematic plan view illustrating an example of a multifaced optical encoder scale in the present disclosure, and is a partial enlarged view of FIG. 3 or FIG. 9.

FIG. 3 is a schematic plan view illustrating an example of a multifaced optical encoder scale including the optical scales arranged in a multifaced manner, and FIG. 4 is a partial enlarged view of FIG. 3. In the present disclosure, the optical encoder scale (reflection-type optical encoder scale 10 or transmission-type optical encoder scale 20) is produced by individualizing the multifaced optical encoder scale 50 as shown in FIG. 3 and FIG. 4.

In the present disclosure, the two-dimensional code may include information configured to identify the location of the optical encoder scale in the multifaced optical encoder scale. In FIG. 3, since 100 optical encoder scales (reflection-type optical encoder scales 10 or transmission-type optical encoder scales 20) are arranged in a multifaced manner in the multifaced optical encoder scale 50, the location of each optical encoder scale (reflection-type optical encoder scale 10 or transmission-type optical encoder scale 20), among 100 optical encoder scales, may be specified by the two-dimensional code. The two-dimensional code includes information indicating the row number and column number, for example, in 10 rows×10 columns. Since the optical encoder scale includes the two-dimensional code, even when the optical encoder scale is an optical encoder scale individualized from a multifaced optical encoder scale, the location of the optical encoder scale, among the multifaced optical encoder scale, at which it was produced may be easily specified.

In the substrate of a multifaced optical encoder scale, a swell or a warpage may exist in the substrate itself. Also, in the two regions with different reflectance or transmittance in the multifaced optical encoder scale, an error from the design value may occur in relation to a pattern size, reflectance, or transmittance. In such cases, the properties of the optical encoder scale vary according to the location in the multifaced optical encoder scale. In such cases, by specifying the location of the optical encoder scale in the multifaced optical encoder scale by the two-dimensional code, the properties varying according to the location in the multifaced optical encoder scale may be understood even after the individualization of the optical encoder scale from the multifaced optical encoder scale. For example, the properties of the optical encoder scale varying according to the location in the multifaced optical encoder scale may be understood, and then, the optical encoder scale may be used. Also, for example, when swelling, warpage, error and so on are not allowed, non-defective products and defective products may be sorted smoothly by the location in the multifaced optical encoder scale. Therefore, quality control may be carried out efficiently by linking the properties, varying according to the location in the multifaced optical encoder scale, to the two-dimensional code.

Here, for example, when two regions with different reflectance or transmittance are formed using photolithography, a photomask is repeatedly utilized. Therefore, even when the same photomask is used to produce the optical scale, the condition of the optical scale may change depending on the conditions such as the number of times the photomask has been used. Therefore, it may be important to specify the time of production, from the viewpoint of traceability.

Conventionally, when photolithography is used to form the two regions with different transmittance or reflectance, the size of the multifaced body in a plan view is, for example, 5 inches square, and in this case, the number of optical scales provided in the multifaced body is relatively small, ranging from several tens to twenty. Therefore, in this case, for mass production, the number of repeated uses of the photomask increases. Therefore, from the viewpoint of traceability, it is important to specify the time of production, such as the number of times the photomask has been used, and the location of the optical scale in the multifaced body has not been considered much. Also, even when information to identify the location of the optical scale in the multifaced body is imparted, since the amount of information to identify the location of the optical scale in the multifaced body is small, it has been sufficient to use characters as the identification information that may be recognized by the human eye or by OCR so that it was not necessary to use a two-dimensional code with a large amount of information.

Meanwhile, when 100 or more, or several hundred optical encoder scales are arranged in a multifaced manner in a multifaced optical encoder scale, since a large number of optical encoder scales are produced at once, it is desired to secure traceability. Also, when the number of optical encoder scales arranged in a multifaced optical encoder scale is large, the substrate in the multifaced optical encoder scale is large so that swelling or warpage is likely to occur in the substrate itself. Further, since the photomasks used in the production is large, variations in pattern dimensions are likely to be caused. Therefore, from the viewpoint of traceability, it is importance to specify the location of the optical encoder scale in the multifaced optical encoder scale. As described above, in the present disclosure, the location of the optical encoder scale in the multifaced optical encoder scale may be specified by the two-dimensional code. Therefore, the present disclosure is useful when the number of the optical encoder scales in the multifaced optical encoder scale is large, and the multifaced optical encoder scale is large.

Also, as described later, when a low reflection layer is placed in a pattern on the first surface of the high reflection substrate; a region where the low reflection layer is placed is a low reflection region; and a region where the low reflection layer is not placed is a high reflection region, in the present disclosure, the optical pattern and the two-dimensional code may be formed at the same time. Also, as described later, when a high reflection layer is placed in a pattern on the first surface of the low reflection substrate; a region where the high reflection layer is placed is a high reflection region; and a region where the high reflection layer is not placed is a low reflection region, in the present disclosure, the optical pattern and the two-dimensional code may be formed at the same time. Also, as described later, when a light shielding layer is placed in a pattern on the first surface of the transparent substrate; a region where the light shielding layer is placed is a light shielding region; and a region where the light shielding layer is not placed is a transparent region, in the present disclosure, the optical pattern and the two-dimensional code may be formed at the same time. Therefore, the optical encoder scale including a two-dimensional code may be produced without increasing the number of production steps.

The optical encoder scale in the present disclosure is hereinafter described for each configuration.

1. Two-Dimensional Code

In the present disclosure, the production history of the optical encoder scale is associated with the two-dimensional code.

The optical encoder scale in the present disclosure is preferably produced by individualizing the multifaced optical encoder scale. Therefore, the two-dimensional code preferably includes information configured to identify the location of the optical encoder scale in the multifaced optical encoder scale.

Also, when the optical encoder scale is produced using a photolithography, the two-dimensional code may include information configured to identify the photomask. The information configured to identify the photomask is information peculiar to the photomask. In the multifaced optical encoder scale, the information configured to identify the photomask is identical.

Also, the two-dimensional code may include information indicating, for example, the manufacturer, manufacturing date, and lot number.

The two-dimensional code may be, for example, a matrix-type two-dimensional code, and may be a stack-type two-dimensional code. In particular, the matrix-type two-dimensional code is preferable. The matrix-type two-dimensional code may include more information, and is easy to be read. Also, since the matrix two-dimensional code is generally square, whereas the stacked two-dimensional code is generally rectangular, the matrix-type two-dimensional code may be easily placed in the region other than the optical pattern region, compared to the stacked-type two-dimensional code. Specifically, examples thereof may include QR codes (registered trademark), micro QR codes, rMQR codes, data matrixes, Veri Code, Aztec Code, and Maxi Code. Among them, QR codes (registered trademark), micro QR codes, rMQR codes and data matrixes are preferable; micro QR codes, rMQR codes, and data matrixes are more preferable; and data matrices are further preferable. The QR codes (registered trademark) are highly versatile. Also, with micro QR codes, rMQR codes and data matrixes, since the size of the two-dimensional code may be decreased, the two-dimensional code may be easily placed in the region other than the optical pattern region, in the optical encoder scale.

In the optical encoder scale in the present disclosure, the location of the two-dimensional code is not particularly limited, and the two-dimensional code is preferably placed in a region other than the optical pattern region. Incidentally, the optical pattern region is a region where the optical pattern is placed. The optical pattern includes two regions with different reflectance or transmittance. The optical pattern is a pattern used in an optical encoder to detect the displacement of the optical encoder scale.

Also, as for the location of the two-dimensional code, the end portion of the two-dimensional code 24 is preferably at a distance d1 away from the end portion of the optical scale encoder 20, as shown in FIG. 2. The distance d1 is preferably 0.2 mm or more, and more preferably 0.5 mm or more. In this case, the end portion of the two-dimensional code 14 or 24 in the multifaced optical encoder scale 50 is at a distance d1 away from the planned cutting line L, as shown in FIG. 4. When the distance d1 is in the range described above, the two-dimensional code may be suppressed from being affected by cutting. Specifically, the reading of the two-dimensional code may be suppressed from being affected by cutting. Meanwhile, the upper limit of the distance d1 is not particularly limited as long as the two-dimensional code is located in the region other than the optical pattern region.

Also, as for the location of the two-dimensional code, the end portion of the two-dimensional code 24 is preferably at a distance d2 away from the end portion of the optical pattern region where the optical pattern 23 is placed, as shown in FIG. 2 for example. The distance d2 is preferably 3 mm or more, and more preferably 10 mm or more. Meanwhile, the upper limit of the distance d2 is not particularly limited as long as the two-dimensional code is placed in the region other than the optical pattern region, and the distance d1 is in a predetermined range.

In the two-dimensional code, the size of the cell is preferably, for example, 300 μm or less, may be 200 μm or less, and may be 100 μm or less. When the size of the cell is in the above range, although it depends on the type of the two-dimensional code, the size of the two-dimensional code may be made relatively small. Therefore, the two-dimensional code may be easily placed in a region other than the optical pattern region. Meanwhile, the size of the cell is preferably, for example, 10 μm or more, may be 20 μm or more, and may be 30 μm or more. When the size of the cell is in the above range, the two-dimensional code may be read without being magnified so that the efficiency may be improved. Also, when the size of the cell is too small, it may be difficult to form the two-dimensional code. Specifically, the size of the cell is preferably 10 μm or more and 300 μm or less, may be 20 μm or more and 200 μm or less, and may be 30 μm or more and 100 μm or less.

Also, in two-dimensional code, the width of the bar is similar to the size of the cell described above.

The size of the two-dimensional code is preferably, for example, 3000 μm or less, may be 2000 μm or less, and may be 1500 μm or less. When the size of the two-dimensional code is in the above range, the two-dimensional code may be easily placed in a region other than the optical pattern region. Meanwhile, the size of the two-dimensional code is preferably, for example, 100 μm or more, may be 300 μm or more, and may be 500 μm or more. When the size of the two-dimensional code is in the above range, although it depends on the type of the two-dimensional code, the two-dimensional code may be read without being magnified so that the efficiency may be improved. Also, when the size of the two-dimensional code is too small, it may be difficult to form the two-dimensional code. Specifically, the size of the two-dimensional code is preferably 100 μm or more and 3000 μm or less, may be 300 μm or more and 2000 μm or less, and may be 500 μm or more and 1500 μm or less.

Figure 5A:
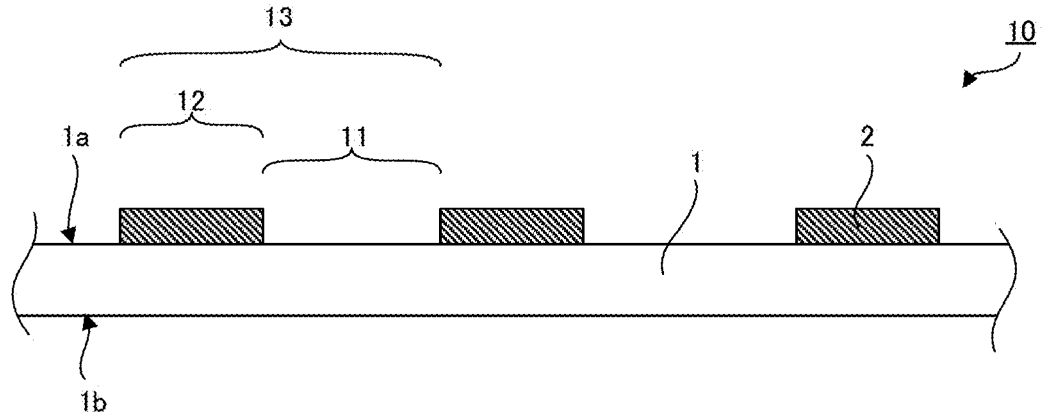
FIGS. 5A to 5C are schematic cross-sectional views illustrating an example of an optical encoder scale in the present disclosure.
Figure 5B:
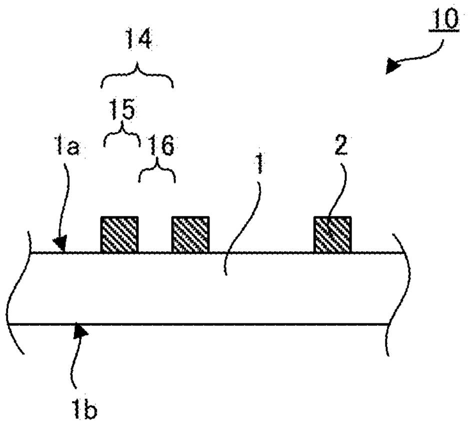

For example, as shown in FIG. 5A, when a low reflection layer 2 is placed in a pattern on the first surface 1*a* of the high reflection substrate 1; a region where the low reflection layer 2 is placed is a low reflection region 12; and a region where the low reflection layer 2 is not placed is a high reflection region 11, the two-dimensional code is preferably formed at the same time as the optical pattern 13. That is, the material of the two-dimensional code is preferably the same as the material of the optical pattern. In the above case, as shown in FIG. 5B for example, in the two-dimensional code 14, the code portion 15 may be a portion where the low reflection layer 2 is placed, and the background portion 16 may be a portion where the low reflection layer 2 is not placed. Also, although not shown in the figures, in the two-dimensional code, the code portion may be a portion where the low reflection layer is not placed, and the background portion may be a portion where the low reflection layer is placed.

Also, although not shown in the figures, when a high reflection layer is placed in a pattern on the first surface of the low reflection substrate; a region where the high reflection layer is placed is a high reflection region; and a region where the high reflection layer is not placed is a low reflection region, the two-dimensional code is preferably formed at the same time as the optical pattern. That is, the material of the two-dimensional code is preferably the same as the material of the optical pattern. In the above case, in the two-dimensional code, the code portion may be a portion where the high reflection layer is placed, and the background portion may be a portion where the high reflection layer is not placed. Also, in the two-dimensional code, the code portion may be a portion where the high reflection layer is not placed, and the background portion may be a portion where the high reflection layer is placed.

Figure 6A:
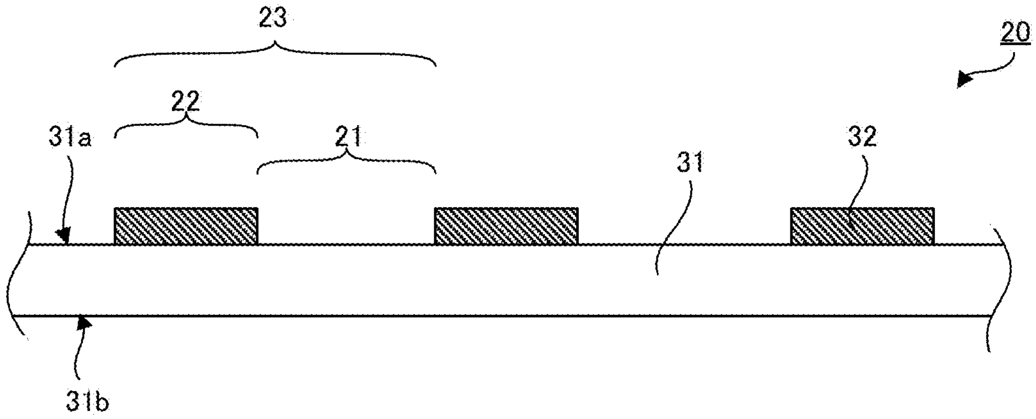
FIGS. 6A and 6B are schematic cross-sectional views illustrating an example of an optical encoder scale in the present disclosure.
Figure 6B:
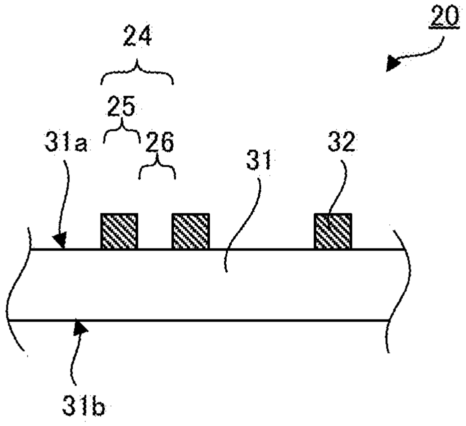

Also, as shown in FIG. 6A for example, when a light shielding layer 32 is placed in a pattern on the first surface 31*a* of the transparent substrate 31; a region where the light shielding layer 32 is placed is a light shielding region 22; and a region where the light shielding layer 32 is not placed is a transparent region 21, the two-dimensional code is preferably formed at the same time as the optical pattern 23. That is, the material of the two-dimensional code is preferably the same as the material of the optical pattern. In the above case, as shown in FIG. 6B for example, in the two-dimensional code 24, the code portion 25 may be a portion where the light shielding layer 32 is placed, and the background portion 26 may be a portion where the light shielding layer 32 is not placed. Also, although not shown in the figures, in the two-dimensional code, the code portion may be a portion where the light shielding layer is not placed, and the background portion may be a portion where the light shielding layer is placed.

2. Other Identification Information

The reflection-type optical encoder scale in the present disclosure may further include additional identification information other than the two-dimensional code. Examples of the other identification information may include manufacturer, date of manufacture, and lot number. Examples of the other identification information may include letters, numbers, and symbols. The other identification information may be identified by the human eye, and letters may be identified by OCR.

In the optical encoder scale in the present disclosure, the location of the other identification information is not particularly limited, and the other identification information is preferably placed in a region other than the optical pattern region.

The other identification information may be formed at the same time as the optical pattern, similarly to the two-dimensional code.

3. Reflection-Type Optical Encoder Scale

The reflection-type optical encoder scale in the present disclosure comprises an optical pattern including two regions with different reflectance, that is, a high reflection region and a low reflection region. The configuration of the reflection-type optical encoder scale in the present disclosure is not particularly limited as long as it includes an optical pattern including a high reflection region and a low reflection region. The reflection-type optical encoder scale may include a high reflection substrate including a first surface and a second surface facing the first surface; and a low reflection layer, placed on the first surface side of the high reflection substrate, placed in a pattern. Also, the reflection-type optical encoder scale may include a low reflection substrate including a first surface and a second surface facing the first surface; and a high reflection layer, placed on a first surface side of the low reflection substrate, placed in a pattern. Each aspect is hereinafter described.

(1) Reflection-Type Optical Encoder Scale in First Aspect

The reflection-type optical encoder scale in the first aspect in the present disclosure includes a high reflection substrate including a first surface and a second surface facing the first surface; and a low reflection layer, placed in a pattern on a first surface side of the high reflection substrate.

FIG. 5A is a line A-A enlarged cross-sectional view of the dotted frame "a" portion in FIG. 1. As shown in FIG. 1 and FIG. 5A, a reflection-type optical encoder scale 10 includes a disk-shaped high reflection substrate 1 including a first surface 1*a* and a second surface 1*b* facing the first surface 1*a*; and a low reflection layer 2, placed on a first surface 1*a* side of the high reflection substrate 1, placed along the circumference direction of the high reflection substrate 1 in a pattern. The reflection-type optical encoder scale 10 has a perforated disk shape, and the low reflection region 12 wherein the low reflection layer 2 is placed, and the high reflection region 11 wherein the low reflection layer 2 is not placed are placed alternately in the circumference direction. The low reflection region 12 includes a high reflection substrate 1 and a low reflection layer 2 in the thickness direction of the reflection-type optical encoder scale 10. The high reflection region 11 includes a high reflection substrate 1. The reflectance in the high reflection region 11 is higher than the reflectance in the low reflection region 12. Incidentally, the reflectance in the high reflection region 11 and the reflectance in the low reflection region 12 indicate the reflectance of the same wavelength and the same incident angle.

The reflection-type optical encoder scale in the present aspect will be described for each configuration.

(a) High Reflection Substrate

The high reflection substrate in the present aspect has high reflectance. The reflectance in the first surface of the high reflection substrate is, for example, 50% or more, may be 55% or more, and may be 60% or more. the reflectance is, for example, 100% or less. Specifically, the reflectance in the first surface of the high reflection substrate is 50% or more and 100% or less, may be 55% or more and 100% or less, and may be 60% or more and 100% or less. When the reflectance is in the above range, the difference between the reflectance in the high reflection region and the reflectance in the low reflection region is large so that false detection by the light detector may be prevented, and the accuracy of signal detection may be improved.

Incidentally, in the present descriptions, the reflectance is the reflectance with respect to the detection light used in the optical encoder. In the high reflection substrate, when the wavelength of the incident light is any one in a wavelength range of 500 nm or more and 1000 nm or less, the reflectance in an incident angle range of 5° or more and 70° or less is preferably in the above range.

For the measurement of the reflectance, a Solid Spec 3700DUV from Shimadzu Corporation is used. The irradiated beam size is approximately 6 mm×15 mm. 45° linear polarized light is calculated, and the reflectance is calculated by measuring for both P-polarized light and S-polarized light and averaging the sum.

The high reflection substrate may be a metal substrate, and may include a supporting substrate and a metal layer placed on one surface of the supporting substrate.

The material of the metal substrate preferably satisfies the reflectance described above, and examples thereof may include stainless steel (SUS), copper, and aluminum.

The thickness of the metal substrate is, for example, 0.1 mm or more, may be 0.3 mm or more, and may be 0.35 mm or more. Also, the thickness of the metal substrate is, for example, 1.1 mm or less, may be 0.5 mm or less, and may be 0.45 mm or less. Specifically, the thickness of the metal substrate is 0.1 mm or more and 1.1 mm or less, may be 0.3 mm or more and 0.5 mm or less, and may be 0.35 mm or more and 0.45 mm or less.

Examples of the material of the supporting substrate may include glass and resin. In the case of glass, the linear expansion coefficient of the glass is small, so that the dimensional variation due to temperature variation in the use environment may be suppressed.

Also, the material of the metal layer preferably satisfies the reflectance described above, and examples thereof may include chromium, silver, aluminum, rhodium, gold, and copper, and alloys including these metals as a main component. Among them, a metallic chromium film is preferable.

The thickness of the metal layer is, for example, 0.05 μm or more and may be 0.1 μm or more. Also, the thickness of the metal layer is, for example, 0.3 μm or less, and may be 0.2 μm or less. Specifically, the thickness of the metal layer is, for example, 0.05 μm or more and 0.3 μm or less, and may be 0.1 μm or more and 0.2 μm or less.

Here, the "thickness" of each member means a thickness obtained by a general method for measuring. Examples of the method for measuring the thickness may include a stylus-type method of calculating the thickness by detecting the unevenness of the surface by tracing with a stylus; and an optical-type method of calculating the thickness based on a spectral reflection spectrum. Specifically, the thickness is measured using a stylus-type film thickness meter "P-15" from KLA Corporation. Also, an average value of thickness measurement values at a plurality of locations of the target member may be employed as the thickness. For example, in the case of the metal substrate, the average value of thickness measurement values at two locations with symmetry in the center of the disk-shaped metal substrate may be used.

In the case of a rotary encoder, the high reflection substrate has a disk-shape. The high reflection substrate may be, for example, a perforated disk with a center hole, and may not have a center hole. Meanwhile, in the case of a linear encoder, the high reflection substrate has a rectangular shape.

When the high reflection substrate is a perforated disk shape, in a plan view, the outer diameter of the high reflection substrate is, for example, 15 mm or more, and may be 20 mm or more. Meanwhile, the outer diameter of the high reflection substrate is, for example, 70 mm or less, and may be 60 mm or less. Specifically, the outer diameter of the high reflection substrate is, for example, 15 mm or more and 70 mm or less, and may be 20 mm or more and 60 mm or less.

Also, in the above case, in a plan view, the inner diameter of the high reflection substrate is, for example, 5 mm or more and 20 mm or less.

Also, in the above case, the difference between the outer diameter and the inner diameter, that is, outer-inner diameter difference is, for example, 8 mm or more and 13 mm or less.

Figure 5C:
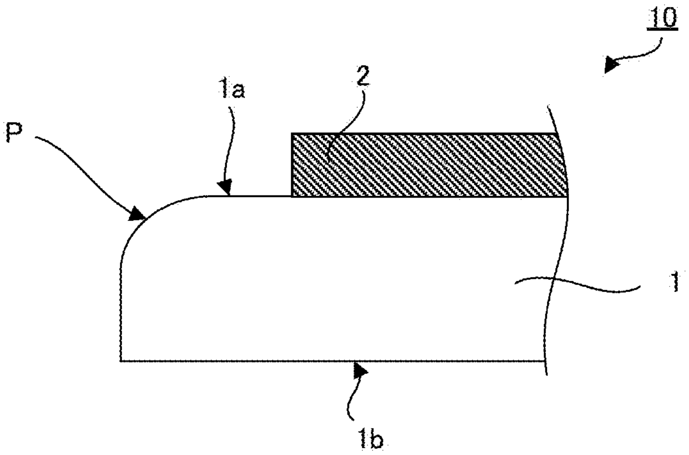

When the high reflection substrate is a metal substrate or includes a resin substrate, the high reflection substrate may include a sag on the outer periphery edge on the first surface side. FIG. 5C is a line B-B enlarged cross-sectional view of the dotted frame "b" in FIG. 1. In FIG. 5C, the high reflection substrate 1 includes a sag P on the outer periphery edge on the first surface 1*a* side. The reflection-type optical encoder scale including a sag on the outer periphery edge on the first surface side of the high reflection substrate is usually produced by punching a multifaced body. In the case of the punching process of a multifaced body, unlike the etching process of a multifaced body, there is no need to provide a bridge linking the optical encoder scale and the frame, so that no bridge marks are caused. Therefore, occurrence of a partial distortion may be suppressed. Also, there is no need to reduce the thickness of the metal substrate to reduce costs or improve accuracy. As a result, the thickness of the metal substrate may be increased, and swell and warpage may be suppressed. Also, it is advantageous in terms of cost compared to the etching process of the multifaced body.

Also, when the high reflection substrate is a metal substrate, or includes a resin substrate, and when the high reflection substrate has a perforated disk shape, the high reflection substrate may include a sag on the inner periphery edge on the first surface side.

(b) Low Reflection Layer

The low reflective layer in the present aspect is placed in a pattern on the first surface side of the high reflection substrate.

The reflectance in the low reflection region has only to be lower than the reflectance in the high reflection region. Specifically, the reflectance in the low reflection region has only to be lower than the reflectance in the first surface of the high reflection substrate. In the low reflection region, the reflectance of any one in a wavelength range of 500 nm or more and 1000 nm or less is, for example, 10% or less, may be 5% or less, and may be 1% or less. Meanwhile, the reflectance in the low reflection region is, for example, 0% or more. Specifically, the reflectance in the low reflection region is 0% or more and 10% or less, may be 0% or more and 5% or less, and may be 0% or more and 1% or less. When the reflectance is in the above range, the difference between the reflectance in the high reflection region and the reflectance in the low reflection region may be increased.

In the low reflection region, when the wavelength of the incident light is any one in a wavelength range of 500 nm or more and 1000 nm or less, the reflectance of any one in an incident angle range of 5° or more and 70° or less is preferably in the above range.

The configuration of the low reflection layer is not particularly limited as long as it satisfies the reflectance described above. In particular, the low reflection layer preferably includes a metallic chromium film, and a chromium oxide film and a chromium nitride film randomly placed on the surface of the metallic chromium film, opposite to the high reflection substrate. With such the low reflection layer having three-layered structure, the reflectance in the low reflection region may be reduced so as to be in the range described above. Also, the chromium oxide film and the chromium nitride film may be easily formed by utilizing a reactive sputtering method, for example, by only preparing the metallic chromium. Further, with such the low reflection layer described above, compared to a silicon oxide film, a high precision patterning may be easily carried out.

In the present descriptions, "a chromium oxide film and a chromium nitride film randomly placed on the surface of the metallic chromium film, opposite to the high reflection substrate" means that they may be placed in the order of the metallic chromium film, the chromium oxide film and the chromium nitride film, and may be placed in the order of the metallic chromium film, the chromium nitride film and the chromium oxide film.

Figure 7A:
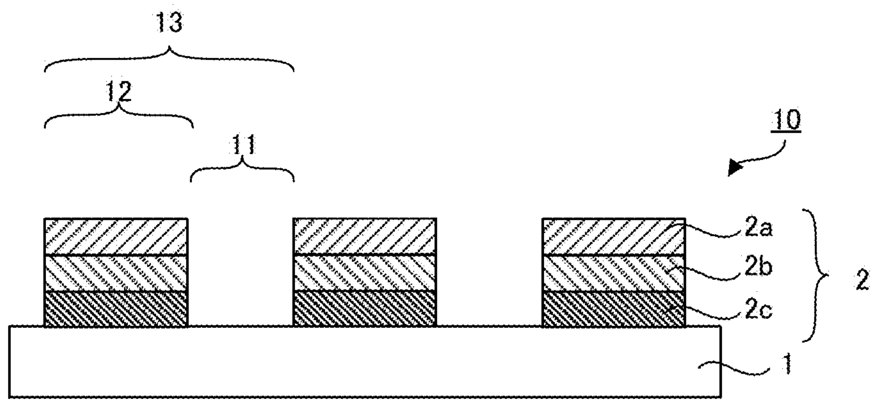
FIGS. 7A and 7B are schematic cross-sectional views illustrating an example of an optical encoder scale in the present disclosure.
Figure 7B:
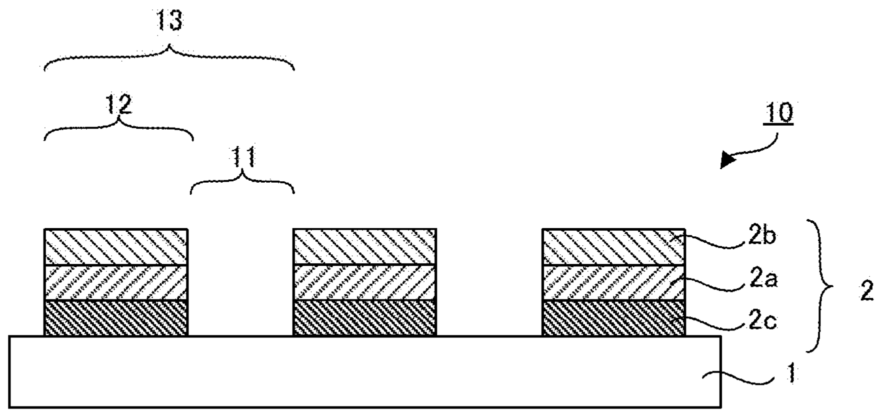

For example, in FIG. 7A, the low reflection layer 2 includes the metallic chromium film 2*c*, the chromium nitride film 2*b*, and the chromium oxide film 2*a* from the high reflection substrate 1 side. Meanwhile, in FIG. 7B, the low reflection layer 2 includes the metallic chromium film 2*c*, the chromium oxide film 2*a*, and the chromium nitride film 2*b* from the high reflection substrate 1 side.

In the low reflection layer, a film located on the outermost surface opposite to the high reflection substrate is preferably the chromium oxide film or the chromium nitride film, and more preferably the chromium oxide film. The reason therefor is to reduce the reflectance in the low reflection region more effectively.

Hereinafter, "low reflection layer wherein a metallic chromium film, a chromium nitride film, and a chromium oxide film are placed in this order" is referred to as a low reflection layer in the first aspect, "low reflection layer wherein a metallic chromium film, a chromium oxide film, and a chromium nitride film are placed in this order" is referred to as a low reflection layer in the second aspect.

(i) Low Reflection Layer in First Aspect

In the low reflection layer in the present aspect, the metallic chromium film, the chromium nitride film, and the chromium oxide film are placed in this order from the high reflection substrate side. In the low reflection region including the low reflection layer in the present aspect, the reflectance of any one in a wavelength range of 500 nm or more and 1000 nm or less may be reduced to 5% or less, and particularly 0.5% or less. Also, the reflectance variation with respect to the wavelength variation is gentle so that it is easy to control the reflectance.

(i-1) Metallic Chromium Film

In the present aspect, the metallic chromium film is placed on the first surface of the high reflection substrate. The metallic chromium film is a layer including metallic chromium. The metallic chromium film is a layer which does not substantially transmit the light irradiated from the light source, and the transmittance in the layer is preferably 0.0% or more and 1.0% or less. The transmittance is measured using a spectrophotometer "MPC-3100" from Shimadzu Corporation. The thickness of the metallic chromium film is preferably, for example, 40 nm or more, and more preferably 70 nm or more.

As a method for forming a metallic chromium film, for example, a physical vapor deposition method (PVD) such as a sputtering method, an ion plating method, and a vacuum vapor deposition method is used.

(i-2) Chromium Nitride Film

The chromium nitride film in the present aspect is placed between the metallic chromium film and the chromium oxide film. Unlike the chromium oxynitride, and chromium oxynitride carbide, for example, the chromium nitride film includes chromium and nitrogen as main components, and does not substantially include impurities other than chromium and nitrogen.

In the chromium nitride ($CrN_x$) film, "x" representing an atomic ratio of Cr and N is preferably 0.4 or more and 1.1 or less.

Also, regarding the ratio of all elements included in the chromium nitride film as 100 atomic %, the ratio of chromium and nitrogen is preferably 80 atomic % or more and 100 atomic % or less, and more preferably 90 atomic % or more and 100 atomic % or less. As the impurity, for example, hydrogen, oxygen, and carbon may be included in the chromium nitride film.

The thickness ($T_N$) of the chromium nitride film is preferably, for example, 5 nm or more and 100 nm or less, and more preferably 10 nm or more and 80 nm or less. Also, in relation to the thickness ($T_O$) of the chromium oxide film described later, when the wavelength is 850 nm, the total of $T_N$ and $T_O$ is preferably 40 nm or more. Also, when the wavelength is 550 nm, the total of $T_N$ and $T_O$ is preferably 20 nm or more. When the thickness is in the above range, the reflectance in the low reflection region may be easily reduced so as to be in a desired range, as compared with a case wherein the thickness is out of the above range. Further, the thickness of the chromium nitride film is preferably 10 nm or more and 80 nm or less. The reflectance in the entire range from green to infrared, that is, the reflectance in the range of approximately 500 nm or more and 1000 nm or less, may be easily reduced.

As a method for forming a chromium nitride, for example, a physical vapor deposition method (PVD) such as a reactive sputtering method, an ion plating method, and a vacuum vapor deposition method is used. When the reactive sputtering method is used, nitrogen may be introduced into argon (Ar) gas, and a chromium nitride film may be formed by a reactive sputtering method using a Cr target. In this case, the composition of the chromium nitride film may be controlled by controlling the ratio of Ar gas and nitrogen gas.

(i-3) Chromium Oxide Film

The chromium oxide film in the present aspect is placed on the surface of the chromium nitride film, opposite to the metallic chromium film. The main components of the chromium oxide film are chromium and oxygen, and, unlike chromium oxynitride and chromium oxynitride carbide, it does not substantially include impurities other than chromium and oxygen.

In the chromium oxide (CrOy) film, "y" representing the atomic ratio of Cr and O is preferably 1.4 or more and 2.1 or less.

Specifically, regarding the ratio of all elements included in the chromium oxide film as 100 atomic %, the ratio of chromium and oxygen is preferably 80 atomic % or more and 100 atomic % or less, and more preferably 90 atomic % or more and 100 atomic % or less. As the impurity, for example, hydrogen, nitrogen, and carbon may be included in the chromium oxide film.

The thickness of the chromium oxide film is not particularly limited, and is preferably, for example, 5 nm or more and 100 nm or less, and more preferably 10 nm or more and 80 nm or less. Also, the total of the thickness of the chromium oxide film and the thickness of the chromium nitride film is as described above. Further, the thickness of the chromium oxide film is preferably 10 nm or more and 65 nm or less. The reflectance in the entire range from green to infrared, that is, the reflectance in the range of approximately 500 nm or more and 1000 nm or less, may be easily reduced.

As a method for forming a chromium oxide, for example, a physical vapor deposition method (PVD) such as a reactive sputtering method, an ion plating method, and a vacuum vapor deposition method is used. When the reactive sputtering method is used, oxygen may be introduced into argon (Ar) gas, and a chromium oxide film may be formed by a reactive sputtering method using a Cr target. At this time, the composition of the chromium oxide film may be controlled by controlling the ratio of Ar gas and oxygen gas.

(ii) Low Reflection Layer in Second Aspect

In the low reflection layer in the present aspect, the metallic chromium film, the chromium oxide film, and the chromium nitride film are placed in this order from the high reflection substrate side. In the low reflection region including the low reflection layer in the present aspect, the reflectance of any one in a wavelength range of 500 nm or more and 1000 nm or less may be reduced to 5% or less, and particularly 1% or less.

(ii-1) Metallic Chromium Film

Since the metallic chromium film in the present aspect is similar to the metallic chromium film in the low reflection layer in the first aspect described above, the explanation herein is omitted.

(ii-2) Chromium Oxide Film

The chromium oxide film in the present aspect is placed between the metallic chromium film and the chromium nitride film.

The thickness of the chromium oxide film is not particularly limited, and is preferably, for example, 5 nm or more and 60 nm or less, and more preferably 10 nm or more and 50 nm or less. Also, as described later, the total of the thickness of the chromium oxide film and the thickness of the chromium nitride film is preferably in a predetermined range. Further, since the reflectance in the entire range from green to infrared, that is, the reflectance in the range approximately 500 nm or more and 1000 nm or less, may be easily reduced, the thickness of the chromium oxide film is preferably 5 nm or more and 35 nm or less.

The physical properties, composition and a method for forming of the chromium oxide film are similar to those of the chromium oxide film in the low reflection layer in the first aspect described above, and therefore, the description herein is omitted.

(ii-3) Chromium Nitride Film

The chromium nitride film in the present aspect is placed on the surface of the chromium oxide film, opposite to the metallic chromium film.

The thickness of the chromium nitride film ($T_N$) is not particularly limited, and is preferably, for example, 5 nm or more and 100 nm or less, and more preferably 10 nm or more and 80 nm or less. Further, in relation with the thickness of the chromium oxide film ($T_O$), when the wavelength is 850 nm, the total of $T_N$ and $T_O$ is preferably 30 nm or more, and when the wavelength is 550 nm, the total of $T_N$ and $T_O$ is preferably 15 nm or more. Further, the thickness of the chromium nitride film is preferably 10 nm or more and 60 nm or less. The reflectance in the entire range from green to infrared, that is, the reflectance in the range of approximately 500 nm or more and 1000 nm or less, may be easily reduced.

The method for forming a chromium nitride film is similar to that of the chromium nitride film in the low reflection layer in the first aspect described above, and therefore, the description herein is omitted.

(iii) Method for Forming Low Reflection Layer

The method for forming a low reflection layer is not particularly limited, and the low reflection layer may be formed by a selective etching or a lift-off.

In the case of selective etching, a metallic chromium film is firstly formed on the first surface of the high reflection substrate by, for example, a sputtering method, and then, a chromium nitride film and a chromium oxide film are formed. The metal chromium film, chromium nitride film and chromium oxide film are then patterned by photolithography and etching.

Also, in the case of the lift-off method, for example, a resist pattern is firstly formed on the first surface of the high reflection substrate, and a metallic chromium film, a chromium nitride film and a chromium oxide film are formed using a known vacuum film forming method such as a sputtering method. Thereafter, by removing the resist pattern, the metallic chromium film, chromium nitride film and the chromium oxide film formed immediately on the resist pattern are lifted off, to obtain a pattern of the metallic chromium film, chromium nitride film and chromium oxide film.

(c) Other Configurations

The reflection-type optical encoder scale in the present aspect may include other layers other than the high reflection substrate and the low reflection layer described above. For example, the reflection-type optical encoder scale in the present aspect may include a protective layer between the high reflection substrate and the low reflection layer.

The protective layer preferably has transparency, and also has a function of protecting the high reflection substrate. By providing the protective layer, there is no risk that the surface of the high reflection substrate will be rough and the roughness will increase during etching when forming the low reflection layer in a pattern. Therefore, diffuse reflection of light may be suppressed. In a plane view, the protective layer may be provided over the entire region of the high reflection substrate, and may be provided in a part of the region The material of the protective layer is not particularly limited as long as it has transparency, and it is a material capable of protecting the high reflection substrate and may be either organic material or inorganic material.

The organic material preferably includes resin. The resin used for the protective layer is not limited as long as it is resin capable of obtaining a transparent protective layer, and examples thereof may include ionizing radiation curable resins cured by irradiation of ionizing radiation such as ultraviolet rays and electron beams; and thermosetting resins cured by heating. Specifically, novolac based resins, polyolefin based resins, polyester based resins, urethane based resins, polyimide based resins, acrylic based resins, and epoxy based resins are preferable. Among novolac based resins, phenolic novolac resins are preferable. This is because it has excellent electrical properties and is able to suppress defects caused by charging. Among acrylic based resins, acrylates with three or more functions such as pentaerythritol tetraacrylate and dipentaerythritol tetraacrylate are preferable. The reason therefor is to improve photocuring properties. For epoxy based resins, epoxy acrylate resins with fluorene structure are preferable. The reason therefor is to improve heat resistance, close adhesiveness, and chemical resistance. For epoxy based resins, cardo epoxy resins are also preferable. The reason therefor is to impart excellent transparency, heat resistance, surface hardness, and flatness. In addition to the resins, polymerization initiators and various additives may be included in the organic material.

Examples of the inorganic material may include inorganic compounds. Examples of the inorganic compound may include oxides, oxynitrides, nitrides, oxycarbides, or oxycarbonitrides of metallic or non-metallic elements such as silicon, aluminum, magnesium, calcium, potassium, tin, sodium, titanium, boron, yttrium, zirconium, cerium, and zinc. Particularly, silicone dioxide ($SiO_2$) is preferable. One kind of the inorganic compound may be used alone, and the materials described above may be used in a combination at any ratio.

(2) Reflection-Type Optical Encoder Scale in Second Aspect

The reflection-type optical encoder scale in the second aspect in the present disclosure includes a low reflection substrate including a first surface and a second surface facing the first surface; and a high reflection layer, placed in a pattern on the first surface side of the low reflection substrate.

The reflection-type optical encoder scale in the present aspect will be described for each configuration.

(a) Low Reflection Substrate

The low reflection substrate in the present aspect has low reflectance. The reflectance in the low reflection substrate is similar to the reflectance in the low reflection region in the first aspect of the reflection-type optical encoder scale described above.

The low reflection substrate may be a low reflection substrate of a single layer; and may include a transparent substrate and a low reflection layer placed on the surface of the transparent substrate, opposite side to the high reflection layer.

The material of the low reflection substrate is not particularly limited as long as it has low reflectance, and may be either organic material or inorganic material.

Similarly, the material of the low reflection layer is not particularly limited as long as it has low reflectance, and may be either organic material or inorganic material. The organic material preferably includes resin. The resin used for the low reflection layer is not limited as long as it is resin capable of obtaining a low reflection layer, and examples thereof may include ionizing radiation curable resins cured by irradiation of ionizing radiation such as ultraviolet rays and electron beams; and thermosetting resins cured by heating. Specifically, novolac based resins, polyolefin based resins, polyester based resins, urethane based resins, polyimide based resins, acrylic based resins, and epoxy based resins are preferable. Among novolac based resins, phenolic novolac resins are preferable. This is because it has excellent electrical properties and is able to suppress defects caused by charging. Among acrylic based resins, acrylates with three or more functions such as pentaerythritol tetraacrylate and dipentaerythritol tetraacrylate are preferable. The reason therefor is to improve photocuring properties. For epoxy based resins, epoxy acrylate resins with fluorene structure are preferable. The reason therefor is to improve heat resistance, close adhesiveness, and chemical resistance. For epoxy based resins, cardo epoxy resins are also preferable. The reason therefor is to impart heat resistance, surface hardness, and flatness. In addition to the resins, polymerization initiators and various additives may be included in the organic material.

When the low reflection layer includes inorganic material, the low reflection layer is similar to the low reflection layer in the first aspect of the reflection-type optical encoder scale described above. Among them, the low reflection layer is preferably the low reflection layer in the first aspect or the low reflection layer in the second aspect described above.

The transparent substrate is similar to the transparent substrate in the reflection-type optical encoder scale described below.

In the case of a rotary encoder, the low reflection substrate has a disk-shape. The low reflection substrate may be, for example, a perforated disk-shape with a center hole, and may not have a center hole. Meanwhile, in the case of a linear encoder, the low reflection substrate has a rectangular shape.

When the low reflection substrate is a perforated disk-shape, the outer diameter and inner diameter of the low reflection substrate in a plan view is similar to the outer diameter and inner diameter of the high reflection substrate in the first aspect of the reflection-type optical encoder scale described above.

When the low reflection substrate includes a resin substrate, the low reflection substrate may include a sag on the outer periphery edge on the first surface side. Also, when the low reflection substrate includes a resin substrate, and when the low resin portion substrate has a perforated disk shape, the low reflection substrate may include a sag on the inner periphery edge on the first surface side.

(b) High Reflection Layer

The high reflective layer in the present aspect is placed in a pattern on the first surface side of the low reflection substrate.

The reflectance in the high reflection region has only to be higher than the reflectance in the low reflection region. Specifically, the reflectance in the high reflection region has only to be higher than the reflectance in the low reflection substrate. The reflectance in the high reflection region is similar to the reflectance in the first surface of the high reflection substrate in the first aspect of the reflection-type optical encoder scale described above.

The configuration of the high reflection layer is not particularly limited as long as it satisfies the reflectance described above; and examples thereof may include a metal film. The metal film preferably includes metals with high reflectance. Examples of the metal may include chromium, silver, aluminum, rhodium, gold, and copper; and alloys including these metals as a main component. Among them, a metallic chromium film is preferable. The metallic chromium film is a layer including metallic chromium. The thickness of the metal film is, for example, 0.05 μm or more and 0.3 μm or less, and may be 0.1 μm or more and 0.2 μm or less.

4. Transmission-Type Optical Encoder Scale

The transmission-type optical encoder scale in the present disclosure comprises an optical pattern including two regions with different transmittance, that is, a transmission region and a light shielding region. The configuration of the transmission-type optical encoder scale in the present disclosure is not particularly limited as long as it includes an optical pattern including a transmission region and a light shielding region, and it preferably includes a transparent substrate including a first surface and a second surface facing the first surface; and a light shielding layer placed in a pattern on a first surface side of the transparent substrate.

FIG. 6A is a line A-A enlarged cross-sectional view of the dotted frame "a" portion in FIG. 2. As shown in FIG. 2 and FIG. 6A, a transmission-type optical encoder scale 20 includes a disk-shaped transparent substrate 31 including a first surface 31*a* and a second surface 31*b* facing the first surface 31*a*; and a light shielding layer 32, placed in a pattern on the first surface 31*a* side of the transparent substrate 31, along the circumference direction of the transparent substrate 31. The transmission-type optical encoder scale 20 has a perforated disk-shape, and the light shielding region 22 wherein the light shielding layer 32 is placed, and the transmission region 21 wherein the light shielding layer 32 is not placed, are placed alternately in the circumference direction. The light shielding region 22 includes a transparent substrate 31 and a light shielding layer 32 in the thickness direction of the transmission-type optical encoder scale 20. The transmission region 21 includes a transparent substrate 31. The transmittance in the transmission region 21 is higher than the transmittance in the light shielding region 22. Incidentally, the transmittance in the transmission region 21 and the transmittance in the light shielding region 22 indicate the transmittance of the same wavelength.

The reflection-type optical encoder scale in the present disclosure is hereinafter described for each configuration.

(1) Transparent Substrate

The transparent substrate in the present disclosure has high transmittance. The total light transmittance in the transparent substrate is, for example, 80% or more, may be 85% or more, and may be 90% or more. The total light transmittance is measured according to JIS K7361-1:1997.

Examples of the material of the transparent substrate may include glass and resin. Since glass is high in strength, and the linear expansion coefficient thereof is small, the dimensional variation due to temperature variation in the use environment may be suppressed. The resin preferably satisfies the transmittance described above, and examples thereof may include polyethylene terephthalate (PET), polyethylene naphthalate (PEN), polypropylene (PP), polyethylene (PE), polycarbonate (PC), acryl resin, polyvinyl chloride, polyvinyl alcohol, polyimide, polyetherimide, polyether ether ketone, epoxy resin, silicone resin, and phenol resin.

The thickness of the transparent substrate is not particularly limited as long as it is a thickness satisfying the transmittance described above, and is, for example, 0.1 mm or more and 2 mm or less.

In the case of a rotary encoder, the transparent substrate has a disk-shape. The transparent substrate may be, for example, a perforated disk with a center hole, and may not have a center hole. Meanwhile, in the case of a linear encoder, the transparent substrate has a rectangular shape.

(2) Light Shielding Layer

The light shielding layer in the present disclosure is placed in a pattern on the first surface side of the transparent substrate.

The transmittance in the light shielding region has only to be lower than the transmittance in the transmission region. The optical density of the light shielding region is, for example, 2.5 or more, may be 3.0 or more, may be 3.5 or more, and may be 4.0 or more.

In the present descriptions, the optical density is a transmission density. The optical density is measured using an optical densitometer. An optical densitometer is a measuring instrument with a mechanism configured to measure the intensity of transmitted light by illuminating light on a sample (the object to be measured).
Specifically, a Takano OD reflectometry from Takano Company Limited is used to measure the sample by illuminating light in a vertical direction.

The configuration of the light shielding layer is not particularly limited as long as it satisfies the optical density described above. The configuration of the light shielding layer may be similar, for example, to the configuration of the low reflection layer described above.

5. Method for Producing Optical Encoder Scale

The method for producing an optical encoder scale in the present disclosure preferably includes a multifaced body producing step of producing a multifaced optical encoder scale comprising optical encoder scales arranged in a multifaced manner; and an individualization step of individualizing the multifaced optical encoder scale.

Since the multifaced optical encoder scale will be described later, description herein is omitted.

The method for individualizing the multifaced optical encoder scale differs according to the substrate of the multifaced optical encoder scale. When the substrate of the multifaced optical encoder scale is a high reflection substrate, and the high reflection substrate is a metal substrate, examples of the method may include a punching process and an etching process. Also, when the substrate of the multifaced optical encoder scale is a high reflection substrate, and the high reflection substrate includes a glass substrate; when the substrate of the multifaced optical encoder scale is a low reflection substrate, and the low reflection substrate includes a glass substrate; and when the substrate of the multifaced optical encoder scale is a transparent substrate, and the transparent substrate is a glass substrate, examples of the method may include a machine cutting. Also, when the substrate of the multifaced optical encoder scale is a high reflection substrate, and the high reflection substrate includes a resin substrate; when the substrate of the multifaced optical encoder scale is a low reflection substrate, and the low reflection substrate includes a resin substrate; and when the substrate of the multifaced optical encoder scale is a transparent substrate, and the transparent substrate is a resin substrate, examples of the method may include a punching process.

As described above, in the case of the punching process of a multifaced body, unlike the etching process of a multifaced body, there is no need to provide a bridge linking the optical encoder scale and the frame, so that no bridge marks are caused. Therefore, occurrence of a partial distortion may be suppressed. Also, there is no need to reduce the thickness of the metal substrate to reduce costs or to improve accuracy. As a result, the thickness of the metal substrate may be increased, and swell and warpage may be suppressed. Also, it is advantageous in terms of cost compared to the etching process of the multifaced body.

Also, when the size of the multifaced optical encoder scale is large, upon individualizing the multifaced optical encoder scale, the multifaced optical encoder scale may be divided into a plurality pieces in advance, and then, individualized, instead of individualizing the multifaced optical encoder scale all at once.

Figure 8A:
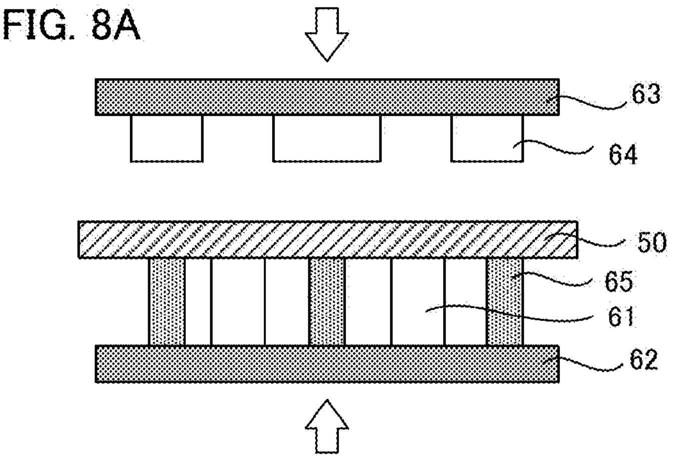
FIGS. 8A and 8B are schematic views illustrating an example of a die-cutting device used in an individualization step in a method for producing an optical encoder scale in the present disclosure.
Figure 8B:
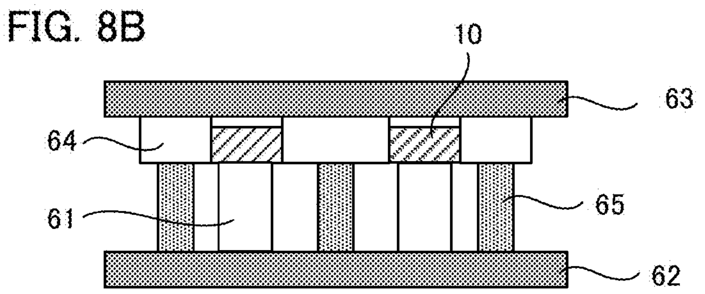

FIGS. 8A and 8B are schematic views illustrating an example of a die-cutting device used in the individualization step. Firstly, as shown in FIG. 8A, a multifaced optical encoder scale 50 is placed on the lower stage 62 including a lower blade 61. Then, as shown in FIG. 8B, by moving and pressing the lower stage 62 upward, and the upper stage 63 including an upper blade 64 downward, the multifaced optical encoder scale 50 is punched. Also, the pressing member 65 is preferably provided at the position facing the upper blade 64. During the punching process, by sandwiching the metal substrate by the upper blade 64 and the pressing member 65, a punching process with less burrs and sags may be carried out. As described above, each reflection-type optical encoder scale 10 is obtained.

6. Use Application of Optical Encoder Scale

The optical encoder scale in the present disclosure may be used for a rotary encoder, and may be used for a linear encoder.

B. Multifaced Optical Encoder Scale

The multifaced optical encoder scale in the present disclosure comprises optical encoder scales including an optical pattern including two regions with different reflectance or transmittance, arranged in a multifaced manner, wherein the optical encoder scale includes a two-dimensional code; the multifaced optical encoder scale includes one or more unit regions; and in the unit region, the two-dimensional code differs for each optical encoder scale.

Figure 9:
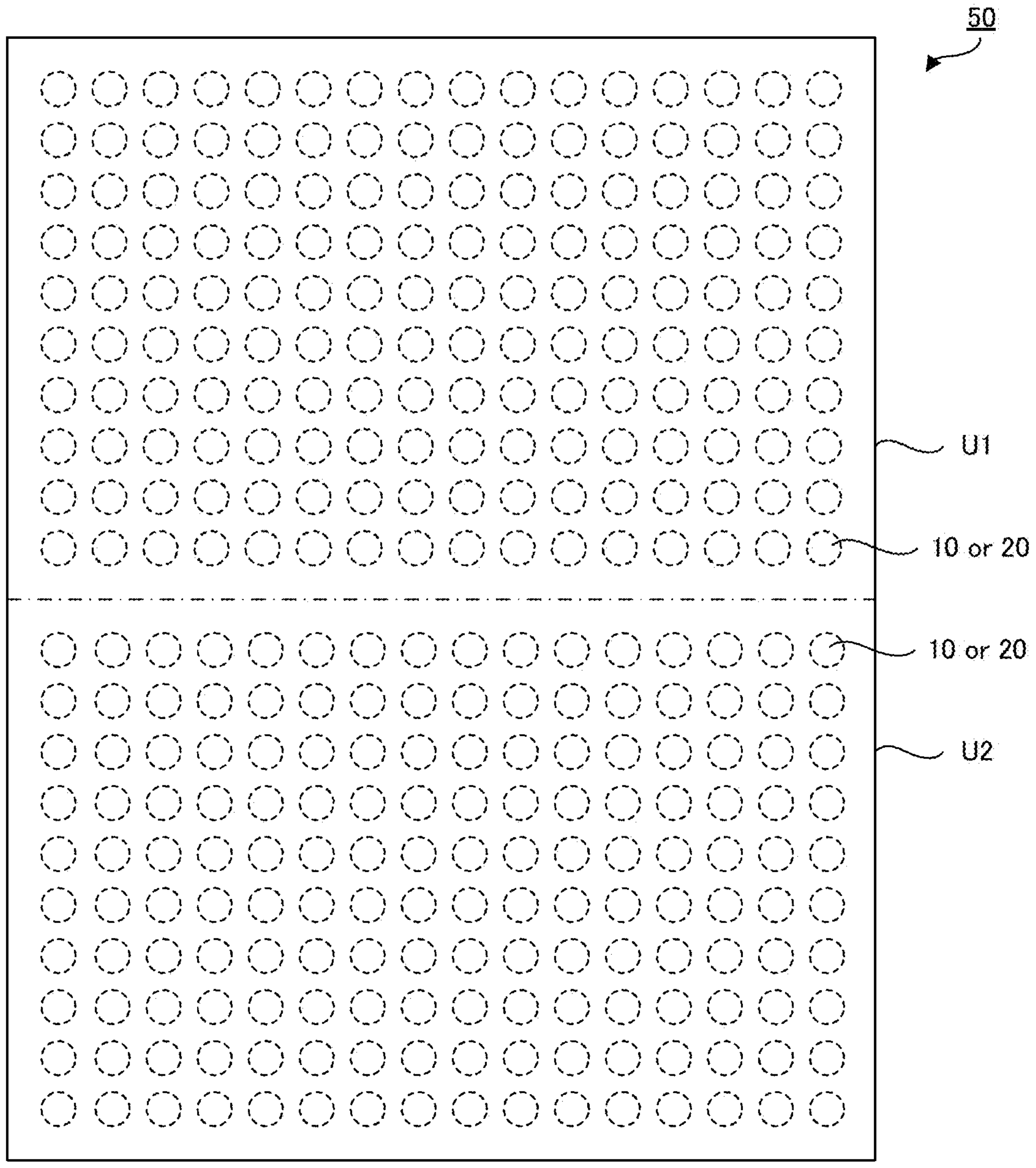
FIG. 9 is a schematic plan view illustrating an example of a multifaced optical encoder scale in the present disclosure.

FIG. 3 and FIG. 9 are schematic plan views illustrating an example of a multifaced optical encoder scale in the present disclosure, and FIG. 4 is a partial enlarged view of FIG. 3 and FIG. 9. As shown in FIG. 3 and FIG. 9, in the multifaced optical encoder scale 50, the optical encoder scales (reflection-type optical encoder scales 10 or transmission-type optical encoder scales 20), comprising an optical pattern including two regions with different reflectance or transmittance, are arranged in a multifaced manner. As shown in FIG. 4, the optical encoder scale (reflection-type optical encoder scale 10 or transmission-type optical encoder scale 20) includes a two-dimensional code 14 or 24.

In FIG. 3, the multifaced optical encoder scale 50 includes one unit region U1, and in the unit region U1, the two-dimensional code 14 or 24 differs for each optical encoder scale (reflection-type optical encoder scale 10 or transmission-type optical encoder scale 20). Specifically, in FIG. 3, total of 100, 10 rows×10 columns, optical encoder scales (reflection-type optical encoder scales 10 or transmission-type optical encoder scales 20), are arranged. In the unit region U1, the two-dimensional code 14 or 24 of the 100 optical encoder scales (reflection-type optical encoder scales 10 or transmission-type optical encoder scales 20) differ from each other.

Meanwhile, in FIG. 9, the multifaced optical encoder scale 50 includes two unit regions U1, U2; in the unit region U1, the two-dimensional code 14 or 24 differs for each the optical encoder scale (reflection-type optical encoder scale 10 or transmission-type optical encoder scale 20); and similarly in the unit region U2, the two-dimensional code 14 or 24 differs for each the optical encoder scale (reflection-type optical encoder scale 10 or transmission-type optical encoder scale 20). Specifically, in FIG. 9, total of 320, 20 rows×16 columns, optical encoder scales (reflection-type optical encoder scales 10 or transmission-type optical encoder scales 20), are arranged. In the unit region U1, 160, 10 rows×16 columns, optical encoder scales (reflection-type optical encoder scales 10 or transmission-type optical encoder scales 20) are arranged; and similarly in the unit region U2, 160, 10 rows×16 columns, optical encoder scales (reflection-type optical encoder scales 10 or transmission-type optical encoder scales 20) are arranged. In the unit region U1, the two-dimensional code 14 or 24 of the 160 optical encoder scales (reflection-type optical encoder scales 10 or transmission-type optical encoder scales 20) differ from each other. Similarly, in the unit region U2, the two-dimensional code 14 or 24 of the 160 optical encoder scales (reflection-type optical encoder scales 10 or transmission-type optical encoder scales 20) differ from each other.

Incidentally, in FIG. 3 and FIG. 9, in order to illustrate graphically, and for easier understanding, a condition where total of 100, 10 rows×10 columns, or total of 320, 20 rows×16 columns optical encoder scales are arranged. However, the number of the optical encoder scales in the multifaced optical encoder scale is not limited thereto.

In the present disclosure, in the unit region, since the two-dimensional code differs for each optical encoder scale, the location of the optical encoder scale in the multifaced optical encoder scale may be identified. Therefore, the effect similar to the optical encoder scale described above may be obtained.

Figure 10:
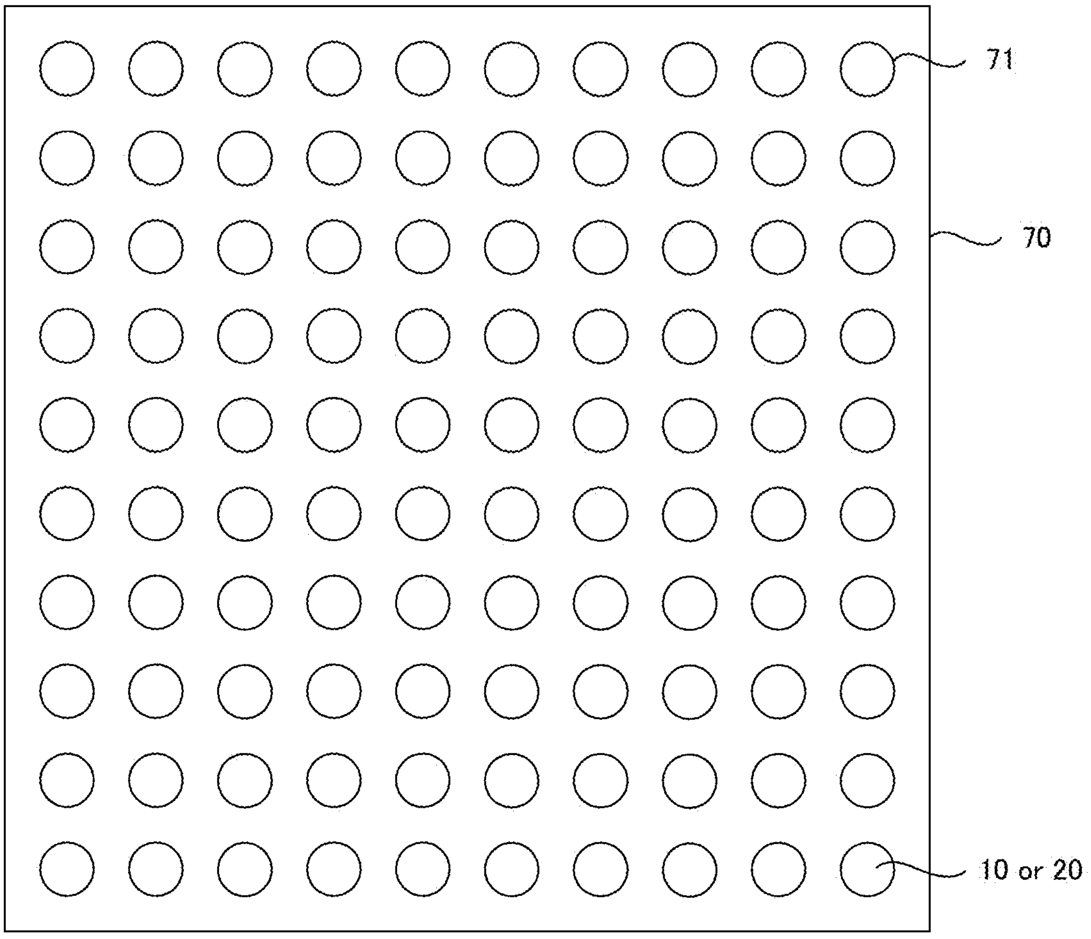
FIG. 10 is a schematic plan view illustrating an example of an optical encoder scale in the present disclosure, in a condition housed in a housing member.

The optical encoder scale produced by individualizing the multifaced optical encoder scale in the present disclosure is described. FIG. 10 is a schematic view illustrating an optical encoder scale in a condition housed in a housing member. As shown in FIG. 10, the optical encoder scale (reflection-type optical encoder scale 10 or transmission-type optical encoder scale 20) is housed in the housing member 70 per unit region. FIG. 10 is an example wherein the multifaced optical encoder scale shown in FIG. 3 is individualized. The housing member 70 is provided with 100 housing portions 71, and the optical encoder scales (reflection-type optical encoder scales 10 or transmission-type optical encoder scales 20), are housed in the housing portions 71.

In FIG. 3, since the multifaced optical encoder scale 50 includes one unit region U1, 100 optical encoder scale are housed in one housing member. Meanwhile, in FIG. 9, since the multifaced optical encoder scale 50 includes two unit regions U1 and U2, the optical scale is housed in the housing member per unit region U1, U2, that is, the optical encoder scales are housed in two housing members, divided so as to be 160 optical encoder scales per unit region.

When the multifaced optical encoder scale in the present disclosure includes a plurality of the unit regions, the optical encoder scales including the same two-dimensional code exist in one unit region and another unit region. Meanwhile, in the unit region, since the two-dimensional code differs for each optical encoder scale, traceability may be ensured by housing the optical encoder scale in the housing member per unit region.

The housing member preferably denotes information indicating the unit region.

In the multifaced optical encoder scale in the present disclosure, the number of the optical encoder scale is preferably, for example, 50 or more, may be 200 or more, and may be 400 or more. In such a case where the number of the optical encoder scales in the multifaced optical encoder scale is large, the present disclosure is useful. Meanwhile, the upper limit of the number of the optical encoder scales in the multifaced optical encoder scale is not particularly limited, and due to the limitations in the manufacturing equipment, the upper limit is, for example, 3000 or less.

The size of the multifaced optical encoder scale in a plan view in the present disclosure is not particularly limited, and the length of one side of the multifaced optical encoder scale is preferably 150 mm or more, more preferably 300 mm or more, and further preferably 350 mm or more. As described above, the present disclosure is useful when the size of the multifaced optical encoder scale in a plan view is large. The upper limit of the size of the multifaced optical encoder scale in a plan view in the present disclosure is not particularly limited, and due to the limitations in the manufacturing equipment, the length of one side of the multifaced optical encoder scale is, for example, 920 mm or less.

The multifaced optical encoder scale in the present disclosure may further include identification information other than the two-dimensional code. Examples of the other identification information may include manufacturer, date of manufacture, and lot number. Examples of the other identification information may include letters, numbers, and symbols. The other identification information may be identified by the human eye, and letters may be identified by OCR.

In the multifaced optical encoder scale in the present disclosure, the location of the other identification information is not particularly limited. The other identification information may be placed on each optical encoder scale, and may be placed in a region other than the optical encoder scale.

In a case of a multifaced optical encoder scale wherein the reflection-type optical encoder scales are arranged in a multifaced manner, the method for arranging the patterned low reflection layer, in a multifaced manner, on the first surface of the high reflection substrate is similar to the method for forming the low reflection layer described above. Also, in a case of the multifaced optical encoder scale wherein the transmission-type optical encoder scales are arranged in a multifaced manner, the method for arranging the patterned light shielding layer, in a multifaced manner, on the first surface of the transparent substrate is similar to the method for forming a light shielding layer described above.

C. Optical Encoder

The optical encoder in the present disclosure comprises the optical encoder scale described above; a light source configured to irradiate measurement light to a surface of the optical encoder scale; and a light detector configured to detect reflected light or transmitted light from the optical encoder scale.

The optical encoder in the present disclosure may be a reflection-type encoder, and may be a transmission-type encoder.

Figure 11:
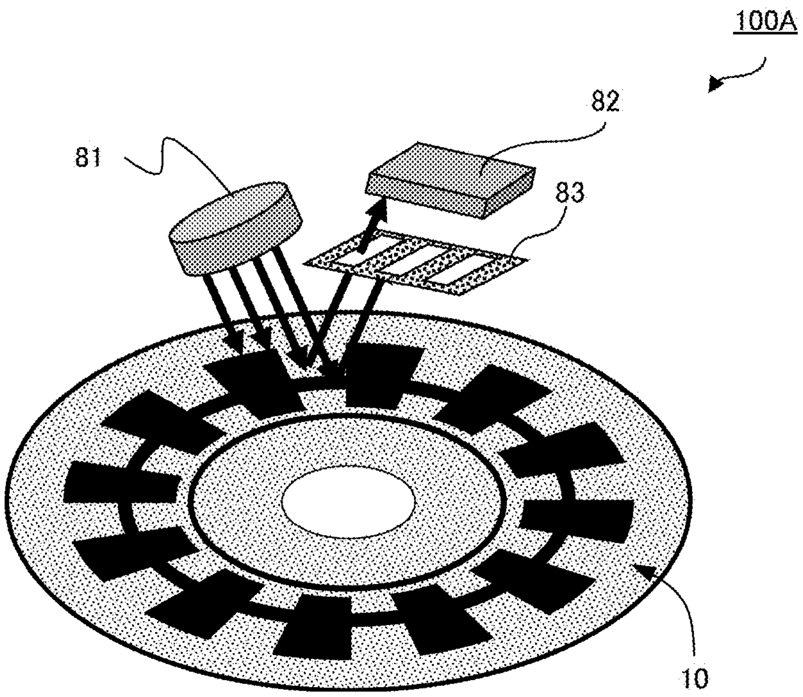
FIG. 11 is a schematic perspective view illustrating an example of an optical encoder in the present disclosure.

FIG. 11 is a schematic perspective view illustrating an example of an optical encoder in the present disclosure, and is an example of a reflection-type encoder. The optical encoder 100A comprises the reflection-type optical encoder scale 10; a light source 81 and a light detector 82 placed on the identical plane with respect to the reflection-type optical encoder scale 10. In FIG. 11, the fixed slit 83 is provided between the light detector 82 and the reflection-type optical encoder scale 10.

Figure 12:
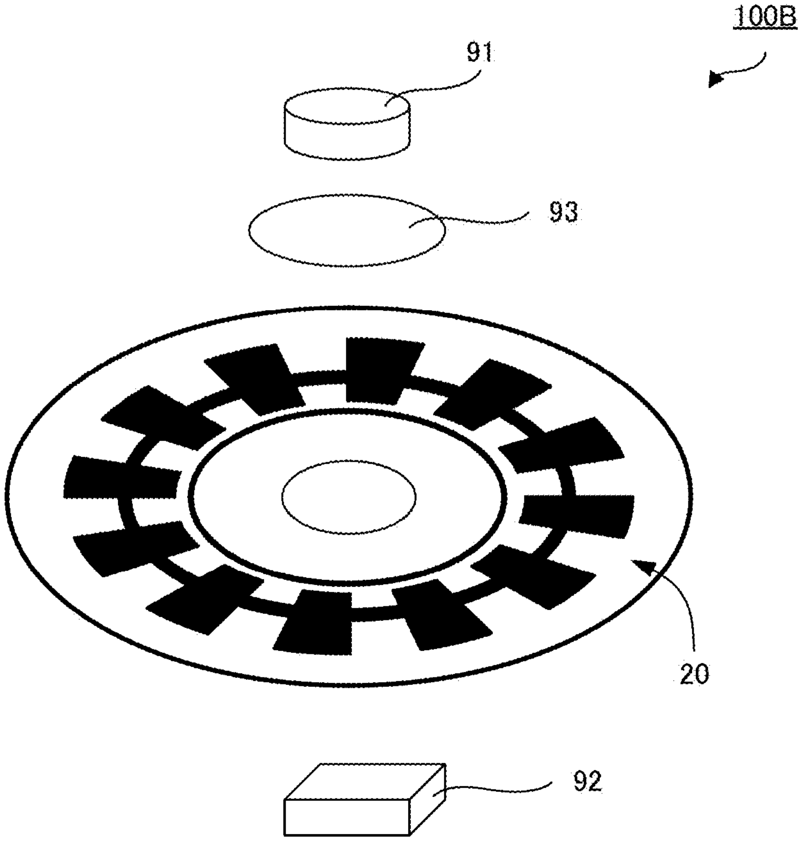
FIG. 12 is a schematic perspective view illustrating an example of an optical encoder in the present disclosure.

FIG. 12 is a schematic perspective view illustrating another example of an optical encoder in the present disclosure, and is an example of a transmission-type encoder.

The optical encoder 100B comprises the transmission-type optical encoder scale 20; a light source 91 placed on one surface side of the transmission-type optical encoder scale 20; and a light detector 92 placed on another surface side of the transmission-type optical encoder scale 20. In FIG. 12, the lens 93 is provided between the light source 91 and the transmission-type optical encoder scale 20.

According to the present disclosure, since the optical encoder scale described above is provided, the effect similar to the optical encoder scale described above may be obtained.

The optical encoder in the present disclosure is hereinafter described for each configuration.

1. Optical Encoder Scale

Since the optical encoder scale is explained in "A. Optical encoder scale" described above, the explanation herein is omitted.

2. Light Source

Examples of the light source may include a LED (light emitting diode) and a laser. The wavelength λ of light irradiated from the light source is, for example, blue to infrared, that is, approximately, 400 nm or more and 1000 nm or less. In the case of the reflection-type encoder, the incident angle of light with respect to the reflection-type optical scale is, for example, 5° or more and 70° or less.

3. Light Detector

The light detector detects light reflected or transmitted by the optical scale. The light detector is provided with, for example, a light receiving element such a photodiode and an imaging element. Examples of the light receiving element may include a photoelectric conversion element.

4. Others

In the case of a reflection-type encoder, the optical encoder in the present disclosure may include a fixed slit between the light detector and the reflection-type optical encoder scale. By providing the fixed slit, the amount variation of the light received by the light detector is increased so that the sensitivity of detection may be improved. The fixed slit may be provided between the light source and the optical encoder scale.

In the case of a transmission-type encoder, the optical encoder in the present disclosure may include a lens between the light source and the transmission-type optical encoder scale. By providing the lens, the light from the light source may be converted from diffusion light to parallel light.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

That is, the present disclosure provides the following inventions.

[1]

An optical encoder scale comprising an optical pattern including two regions with different reflectance or transmittance, wherein the optical encoder scale includes a two-dimensional code.

[2]

The optical encoder scale according to [1], wherein the two-dimensional code is placed in a region other than an optical pattern region where the optical pattern is placed.

[3]

The optical encoder scale according to [1] or [2] comprising a disk-shaped high reflection substrate including a first surface and a second surface facing the first surface; and a low reflection layer placed in a pattern on a first surface side of the high reflection substrate.

[4]

The optical encoder scale according to [1] or [2] comprising a disk-shaped transparent substrate including a first surface and a second surface facing the first surface; and a light shielding layer placed in a pattern on a first surface side of the transparent substrate.

[5]

The optical encoder scale according to any one of [1] to [4], wherein material of the two-dimensional code is same as material of the optical pattern.

[6]

A multifaced optical encoder scale comprising optical encoder scales, including an optical pattern including two regions with different reflectance or transmittance, arranged in a multifaced manner, wherein the optical encoder scale includes a two-dimensional code;

the multifaced optical encoder scale includes one or more unit regions; and in the unit region, the two-dimensional code differs for each optical encoder scale.

[7]

An optical encoder comprising the optical encoder scale according to any one of [1] to [5];

a light source configured to irradiate measurement light to a surface of the optical encoder scale; and a light detector configured to detect reflected light or transmitted light from the optical encoder scale.

REFERENCE SIGNS LIST

1: high reflection substrate
2: low reflection layer
10: reflection-type optical encoder scale
11: high reflection region
12: low reflection region
13: optical pattern
14: two-dimensional code
20: transmission-type optical encoder scale
21: transmission region
22: light shielding region
23: optical pattern
24: two-dimensional code
31: transparent substrate
32: light shielding layer
50: multifaced optical encoder scale
100A, 100B: optical encoder
U1, U2: unit region

What is claimed is:

1. An optical encoder scale, comprising:

an optical pattern including two regions with different reflectance or transmittance, wherein the optical encoder scale includes a two-dimensional code to identify a location of the optical encoder scale in a multifaced optical encoder scale.

2. The optical encoder scale according to claim 1, wherein the two-dimensional code is placed in a region other than an optical pattern region where the optical pattern is placed.

3. The optical encoder scale according to claim 1, comprising:

a high reflection substrate including a first surface and a second surface facing the first surface; and a low reflection layer placed in a pattern on a first surface side of the high reflection substrate.

4. The optical encoder scale according to claim 1, comprising:

a transparent substrate including a first surface and a second surface facing the first surface; and a light shielding layer placed in a pattern on a first surface side of the transparent substrate.

5. The optical encoder scale according to claim 1, wherein a material of the two-dimensional code is a same material of the optical pattern.

6. A multifaced optical encoder scale, comprising:

optical encoder scales, including an optical pattern including two regions with different reflectance or transmittance, arranged in a multifaced manner, wherein the optical encoder scale includes a two-dimensional code;

the multifaced optical encoder scale includes one or more unit regions; and in the unit region, the two-dimensional code differs for each optical encoder scale.

7. An optical encoder, comprising:

the optical encoder scale according to claim 1;

a light source configured to irradiate measurement light to a surface of the optical encoder scale; and a light detector configured to detect reflected light or transmitted light from the optical encoder scale.

8. The optical encoder scale according to claim 1, wherein a production history of the optical encoder scale is associated with the two-dimensional code.

9. The multifaced optical encoder scale according to claim 6, wherein the two-dimensional code is placed in a region other than an optical pattern region where the optical pattern is placed.

10. The multifaced optical encoder scale according to claim 6, comprising:

a high reflection substrate including a first surface and a second surface facing the first surface; and a low reflection layer placed in a pattern on a first surface side of the high reflection substrate.

11. The multifaced optical encoder scale according to claim 6, comprising:

a transparent substrate including a first surface and a second surface facing the first surface; and a light shielding layer placed in a pattern on a first surface side of the transparent substrate.

12. The multifaced optical encoder scale according to claim 6, wherein a material of the two-dimensional code is a same material of the optical pattern.

* * * * *